(12) United States Patent
James et al.

(10) Patent No.: US 7,596,641 B2
(45) Date of Patent: *Sep. 29, 2009

(54) SYSTEM AND METHOD FOR TRANSMITTING DATA PACKETS IN A COMPUTER SYSTEM HAVING A MEMORY HUB ARCHITECTURE

(75) Inventors: Ralph James, Andover, MN (US); Joe Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/432,017

(22) Filed: May 10, 2006

(65) Prior Publication Data

US 2006/0271720 A1 Nov. 30, 2006

Related U.S. Application Data

(63) Continuation of application No. 10/931,326, filed on Aug. 31, 2004, now Pat. No. 7,392,331.

(51) Int. Cl.
*G06F 3/00* (2006.01)
(52) U.S. Cl. .......................................... 710/36; 710/20
(58) Field of Classification Search .................. 710/36, 710/20
See application file for complete search history.

(56) References Cited

U.S. PATENT DOCUMENTS

| | | | |
|---|---|---|---|
| 3,777,154 A | 12/1973 | Lindsey | 250/227 |
| 4,045,781 A | 8/1977 | Levy et al. | 364/200 |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |

(Continued)

FOREIGN PATENT DOCUMENTS

EP 0849685 A2 6/1998

(Continued)

OTHER PUBLICATIONS

Mike Clugston, Definition of 'cache', 2004, www.xreferplus.com.*

(Continued)

*Primary Examiner*—Henry W. H. Tsai
*Assistant Examiner*—Hyun Nam
(74) *Attorney, Agent, or Firm*—Dorsey & Whitney LLP

(57) ABSTRACT

A system and method for transmitting data packets from a memory hub to a memory controller is disclosed. The system includes an upstream reception port coupled an upstream link. The upstream reception port receives the data packets from downstream memory hubs. The system further includes a bypass bus coupled to the upstream reception port. The bypass bus transports the data packets from the upstream reception port. The system further includes a temporary storage coupled to the upstream reception port and configured to receive the data packets from the upstream reception port. The system further includes a bypass multiplexer for selectively coupling an upstream transmission port to either one of a core logic circuit, the temporary storage, or the bypass bus. The system further includes a breakpoint logic circuit coupled to the bypass multiplexer and configured to switch the bypass multiplexer to selectively connect the upstream transmission port to either one of the core logic circuit, the bypass bus, or the temporary storage. The system further includes a local memory coupled to the core logic circuit and operable to receive and send the data packets to the core logic circuit.

27 Claims, 5 Drawing Sheets

U.S. PATENT DOCUMENTS

| | | | |
|---|---|---|---|
| 4,253,146 A | 2/1981 | Bellamy et al. | 364/200 |
| 4,443,845 A | 4/1984 | Hamilton et al. | 364/200 |
| 4,707,823 A | 11/1987 | Holdren et al. | 370/1 |
| 4,724,520 A | 2/1988 | Athanas et al. | 364/200 |
| 4,809,232 A * | 2/1989 | Baumbaugh et al. | 365/221 |
| 4,813,772 A | 3/1989 | Kowel et al. | 350/388 |
| 4,823,403 A | 4/1989 | Twietmeyer | 455/607 |
| 4,825,208 A | 4/1989 | Mueller et al. | 340/825.02 |
| 4,930,128 A | 5/1990 | Suzuki et al. | 371/12 |
| 4,953,930 A | 9/1990 | Ramsey et al. | 350/96.11 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |
| 5,307,381 A | 4/1994 | Ahuja | 375/107 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 395/575 |
| 5,355,391 A | 10/1994 | Horowitz et al. | 375/36 |
| 5,379,382 A | 1/1995 | Work et al. | 395/275 |
| 5,414,819 A | 5/1995 | Redmond et al. | 395/325 |
| 5,423,009 A | 6/1995 | Zhu | 395/325 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/213 |
| 5,479,370 A | 12/1995 | Furuyama et al. | 365/189.12 |
| 5,493,437 A | 2/1996 | Lebby et al. | 359/152 |
| 5,497,476 A | 3/1996 | Oldfield et al. | 395/439 |
| 5,502,621 A | 3/1996 | Schumacher et al. | 361/760 |
| 5,532,856 A | 7/1996 | Li et al. | 359/118 |
| 5,544,319 A | 8/1996 | Acton et al. | 395/200.07 |
| 5,544,345 A | 8/1996 | Carpenter et al. | 395/477 |
| 5,566,325 A | 10/1996 | Bruce, II et al. | 395/494 |
| 5,568,574 A | 10/1996 | Tanguay, Jr. et al. | 385/14 |
| 5,581,767 A | 12/1996 | Katsuki et al. | 395/800 |
| 5,606,717 A | 2/1997 | Farmwald et al. | 395/856 |
| 5,608,264 A | 3/1997 | Gaul | 257/734 |
| 5,623,534 A | 4/1997 | Desai et al. | 379/59 |
| 5,638,334 A | 6/1997 | Farmwald et al. | 365/230.03 |
| 5,659,798 A | 8/1997 | Blumrich et al. | 395/846 |
| 5,715,456 A | 2/1998 | Bennett et al. | 395/652 |
| 5,729,709 A | 3/1998 | Harness | 395/405 |
| 5,787,475 A | 7/1998 | Pawlowski | 711/137 |
| 5,808,897 A | 9/1998 | Miller, Jr. et al. | 364/490 |
| 5,818,844 A | 10/1998 | Singh et al. | 370/463 |
| 5,818,984 A | 10/1998 | Ahmad et al. | 385/14 |
| 5,819,304 A | 10/1998 | Nilsen et al. | 711/5 |
| 5,822,255 A | 10/1998 | Uchida | 365/194 |
| 5,831,467 A | 11/1998 | Leung et al. | 327/319 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,928,343 A | 7/1999 | Farmwald et al. | 710/104 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,023,726 A | 2/2000 | Saksena | 709/219 |
| 6,026,226 A | 2/2000 | Heile et al. | 395/500.13 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,073,190 A | 6/2000 | Rooney | 710/56 |
| 6,076,139 A | 6/2000 | Welker et al. | 711/104 |
| 6,078,451 A | 6/2000 | Ioki | 360/51 |
| 6,079,008 A | 6/2000 | Clery, III | 712/11 |
| 6,088,774 A | 7/2000 | Gillingham | 711/167 |
| 6,098,158 A | 8/2000 | Lay et al. | 711/162 |
| 6,101,151 A | 8/2000 | Watanabe et al. | 365/233 |
| 6,105,075 A | 8/2000 | Ghaffari | 710/5 |
| 6,105,088 A | 8/2000 | Pascale et al. | 710/100 |
| 6,111,757 A | 8/2000 | Dell et al. | 361/737 |
| 6,125,431 A | 9/2000 | Kobayashi | 711/154 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,327 A | 11/2000 | Distinti et al. | 341/126 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,226,729 B1 | 5/2001 | Stevens et al. | 711/171 |
| 6,229,712 B1 | 5/2001 | Munoz-Bustamante et al. | 361/783 |
| 6,229,727 B1 | 5/2001 | Doyle | 365/63 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,253 B1 | 7/2001 | Oberlaender et al. | 365/230.02 |
| 6,256,692 B1 | 7/2001 | Yoda et al. | 710/104 |
| 6,266,730 B1 | 7/2001 | Perino et al. | 710/126 |
| 6,272,609 B1 | 8/2001 | Jeddeloh | 711/169 |
| 6,285,349 B1 | 9/2001 | Smith | 345/147 |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,343,171 B1 | 1/2002 | Yoshimura et al. | 385/50 |
| 6,344,664 B1 | 2/2002 | Trezza et al. | 257/82 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,366,375 B1 | 4/2002 | Sakai et al. | 359/115 |
| 6,366,529 B1 * | 4/2002 | Williams et al. | 365/239 |
| 6,367,074 B1 | 4/2002 | Bates et al. | 717/11 |
| 6,370,068 B2 | 4/2002 | Rhee | 365/196 |
| 6,373,777 B1 | 4/2002 | Suzuki | 365/230.03 |
| 6,381,190 B1 | 4/2002 | Shinkai | 365/230.03 |
| 6,392,653 B1 | 5/2002 | Malandain et al. | 345/501 |
| 6,401,213 B1 | 6/2002 | Jeddeloh | 713/401 |
| 6,405,273 B1 | 6/2002 | Fleck et al. | 710/131 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,434,639 B1 | 8/2002 | Haghighi | 710/39 |
| 6,434,654 B1 | 8/2002 | Story et al. | 710/307 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,377 B1 | 9/2002 | Farnworth et al. | 710/300 |
| 6,453,393 B1 | 9/2002 | Holman et al. | 711/154 |
| 6,457,116 B1 | 9/2002 | Mirsky et al. | 712/16 |
| 6,462,978 B2 | 10/2002 | Shibata et al. | 365/63 |
| 6,463,059 B1 | 10/2002 | Movshovich et al. | 370/389 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |

| | | | |
|---|---|---|---|
| 6,479,322 B2 | 11/2002 | Kawata et al. ............... 438/109 |
| 6,490,188 B2 | 12/2002 | Nuxoll et al. ................. 365/63 |
| 6,493,784 B1 | 12/2002 | Kamimura et al. .......... 710/309 |
| 6,496,909 B1 | 12/2002 | Schimmel ................... 711/163 |
| 6,501,471 B1 | 12/2002 | Venkataraman et al. ..... 345/424 |
| 6,502,161 B1 | 12/2002 | Perego et al. ................. 711/5 |
| 6,505,287 B2 | 1/2003 | Uematsu ..................... 711/170 |
| 6,507,899 B1 | 1/2003 | Oberlaender et al. ........ 711/169 |
| 6,523,092 B1 | 2/2003 | Fanning ...................... 711/134 |
| 6,523,093 B1 | 2/2003 | Bogin et al. ................. 711/137 |
| 6,526,498 B1 | 2/2003 | Mirsky et al. ................. 712/11 |
| 6,539,490 B1 | 3/2003 | Forbes et al. ................ 713/401 |
| 6,552,304 B1 | 4/2003 | Hirose et al. ................ 219/216 |
| 6,552,564 B1 | 4/2003 | Forbes et al. ................. 326/30 |
| 6,553,479 B2 | 4/2003 | Mirsky et al. ................. 712/16 |
| 6,567,963 B1 | 5/2003 | Trezza .......................... 716/8 |
| 6,570,429 B1 | 5/2003 | Hellriegel ................... 327/295 |
| 6,584,543 B2 | 6/2003 | Williams et al. ............ 711/105 |
| 6,587,912 B2 | 7/2003 | Leddige et al. ................ 711/5 |
| 6,590,816 B2 | 7/2003 | Perner ........................ 365/200 |
| 6,594,713 B1 | 7/2003 | Fuoco et al. ................. 710/31 |
| 6,594,722 B1 | 7/2003 | Willke, II et al. ........... 710/313 |
| 6,598,154 B1 | 7/2003 | Vaid et al. ................... 712/237 |
| 6,599,031 B2 | 7/2003 | Li ................................. 385/88 |
| 6,615,325 B2 | 9/2003 | Mailloux et al. ............ 711/154 |
| 6,622,227 B2 | 9/2003 | Zumkehr et al. ............ 711/167 |
| 6,623,177 B1 | 9/2003 | Chilton ........................ 385/88 |
| 6,628,294 B1 | 9/2003 | Sadowsky et al. ........... 345/568 |
| 6,629,220 B1 | 9/2003 | Dyer ............................ 711/158 |
| 6,631,440 B2 | 10/2003 | Jenne et al. .................. 711/105 |
| 6,636,110 B1 | 10/2003 | Ooishi et al. ................. 327/565 |
| 6,636,957 B2 | 10/2003 | Stevens et al. ............... 711/171 |
| 6,643,787 B1 | 11/2003 | Zerbe et al. .................. 713/400 |
| 6,646,929 B1 | 11/2003 | Moss et al. .................. 365/194 |
| 6,651,139 B1 | 11/2003 | Ozeki et al. ................. 711/118 |
| 6,658,509 B1 | 12/2003 | Bonella et al. ............... 710/100 |
| 6,661,940 B2 | 12/2003 | Kim ............................. 385/15 |
| 6,661,943 B2 | 12/2003 | Li ................................. 385/18 |
| 6,662,304 B2 | 12/2003 | Keeth et al. .................. 713/400 |
| 6,667,895 B2 | 12/2003 | Jang et al. ..................... 365/63 |
| 6,681,292 B2 | 1/2004 | Creta et al. .................. 711/119 |
| 6,681,301 B1 | 1/2004 | Mehta et al. ................. 711/154 |
| 6,697,926 B2 | 2/2004 | Johnson et al. .............. 711/167 |
| 6,707,726 B2 | 3/2004 | Nishio et al. ............ 365/189.12 |
| 6,715,018 B2 | 3/2004 | Farnworth et al. ........... 710/300 |
| 6,718,440 B2 | 4/2004 | Maiyuran et al. ............ 711/137 |
| 6,721,187 B2 | 4/2004 | Hall et al. .................... 361/760 |
| 6,721,195 B2 | 4/2004 | Brunelle et al. ............... 365/63 |
| 6,724,685 B2 | 4/2004 | Braun et al. ................. 365/233 |
| 6,728,800 B1 | 4/2004 | Lee et al. ...................... 710/54 |
| 6,735,679 B1 | 5/2004 | Herbst et al. ................ 711/135 |
| 6,735,682 B2 | 5/2004 | Segelken et al. ............. 711/220 |
| 6,745,275 B2 | 6/2004 | Chang ......................... 710/305 |
| 6,751,113 B2 | 6/2004 | Bhakta et al. ................. 365/63 |
| 6,751,703 B2 | 6/2004 | Chilton ........................ 711/113 |
| 6,751,722 B2 | 6/2004 | Mirsky et al. ................. 712/15 |
| 6,752,539 B2 | 6/2004 | Colgan et al. ................. 385/92 |
| 6,754,117 B2 | 6/2004 | Jeddeloh ...................... 365/201 |
| 6,754,812 B1 | 6/2004 | Abdallah et al. ............. 712/234 |
| 6,756,661 B2 | 6/2004 | Tsuneda et al. .............. 257/673 |
| 6,760,833 B1 | 7/2004 | Dowling ....................... 712/34 |
| 6,771,538 B2 | 8/2004 | Shukuri et al. .......... 365/185.05 |
| 6,775,747 B2 | 8/2004 | Venkatraman ............... 711/137 |
| 6,789,173 B1 | 9/2004 | Tanaka et al. ................ 711/147 |
| 6,792,059 B2 | 9/2004 | Yuan et al. ................... 375/354 |
| 6,792,496 B2 | 9/2004 | Aboulenein et al. ......... 710/306 |
| 6,793,408 B2 | 9/2004 | Levy et al. .................... 385/88 |
| 6,793,411 B2 | 9/2004 | Seifert .......................... 385/92 |
| 6,795,899 B2 | 9/2004 | Dodd et al. .................. 711/137 |
| 6,799,246 B1 | 9/2004 | Wise et al. ................... 711/117 |
| 6,799,268 B1 | 9/2004 | Boggs et al. ................. 712/228 |
| 6,804,760 B2 | 10/2004 | Wiliams ...................... 711/170 |
| 6,804,764 B2 | 10/2004 | LaBerge et al. .............. 711/170 |
| 6,807,630 B2 | 10/2004 | Lay et al. ........................ 713/2 |
| 6,811,320 B1 | 11/2004 | Abbott .......................... 385/58 |
| 6,816,931 B2 | 11/2004 | Shih ............................. 710/62 |
| 6,816,947 B1 | 11/2004 | Huffman ..................... 711/151 |
| 6,820,181 B2 | 11/2004 | Jeddeloh et al. ............. 711/169 |
| 6,821,029 B1 | 11/2004 | Grung et al. .................. 385/92 |
| 6,823,023 B1 | 11/2004 | Hannah ....................... 375/296 |
| 6,829,398 B2 | 12/2004 | Ouchi .......................... 385/14 |
| 6,910,812 B2 | 6/2005 | Pommer et al. ............... 385/92 |
| 6,949,406 B2 | 9/2005 | Bosnyak et al. ............. 438/106 |
| 6,950,956 B2 | 9/2005 | Zerbe et al. .................. 713/400 |
| 6,956,996 B2 | 10/2005 | Gordon et al. ................ 385/48 |
| 6,961,259 B2 | 11/2005 | Lee et al. ....................... 365/63 |
| 6,961,834 B2 | 11/2005 | Weber ......................... 711/169 |
| 6,980,748 B2 | 12/2005 | Leas ............................ 398/202 |
| 6,982,892 B2 | 1/2006 | Lee et al. ....................... 365/63 |
| 7,000,062 B2 | 2/2006 | Perego et al. .................. 711/5 |
| 7,016,213 B2 | 3/2006 | Reeves et al. ................. 365/63 |
| 7,016,606 B2 | 3/2006 | Cai et al. ....................... 398/27 |
| 7,024,547 B2 | 4/2006 | Kartoz .......................... 713/1 |
| 7,035,212 B1 | 4/2006 | Mittal et al. ................. 370/230 |
| 7,047,351 B2 | 5/2006 | Jeddeloh ........................ 711/5 |
| 7,062,595 B2 | 6/2006 | Lindsay et al. .............. 710/315 |
| 7,102,907 B2 | 9/2006 | Lee et al. ....................... 365/63 |
| 7,106,611 B2 | 9/2006 | Lee et al. ..................... 365/200 |
| 7,106,973 B2 | 9/2006 | Kube et al. .................. 398/164 |
| 7,120,727 B2 | 10/2006 | Lee et al. ........................ 711/5 |
| 7,120,743 B2 * | 10/2006 | Meyer et al. ................. 711/118 |
| 7,136,953 B1 | 11/2006 | Bisson et al. ................ 710/307 |
| 7,171,508 B2 | 1/2007 | Choi ............................ 710/307 |
| 7,392,331 B2 * | 6/2008 | James et al. .................. 710/36 |
| 2001/0023474 A1 | 9/2001 | Kyozuka et al. ............. 711/114 |
| 2001/0034839 A1 | 10/2001 | Karjoth et al. ............... 713/190 |
| 2001/0039612 A1 | 11/2001 | Lee ................................ 713/2 |
| 2002/0038412 A1 | 3/2002 | Nizar et al. .................. 711/170 |
| 2002/0112119 A1 | 8/2002 | Halbert et al. ............... 711/115 |
| 2002/0116588 A1 | 8/2002 | Beckert et al. ............... 711/161 |
| 2002/0144064 A1 | 10/2002 | Fanning ...................... 711/144 |
| 2003/0005223 A1 | 1/2003 | Coulson et al. ............. 711/118 |
| 2003/0043158 A1 | 3/2003 | Wasserman et al. ......... 345/545 |
| 2003/0043426 A1 | 3/2003 | Baker et al. ................. 359/109 |
| 2003/0093630 A1 | 5/2003 | Richard et al. .............. 711/154 |
| 2003/0163649 A1 | 8/2003 | Kapur et al. ................. 711/146 |
| 2003/0177320 A1 | 9/2003 | Sah et al. ..................... 711/158 |
| 2003/0193927 A1 | 10/2003 | Hronik ......................... 370/351 |
| 2003/0229734 A1 | 12/2003 | Chang et al. .................. 710/36 |
| 2003/0229770 A1 | 12/2003 | Jeddeloh ...................... 711/213 |
| 2004/0015650 A1 | 1/2004 | Zumkehr et al. ............ 711/105 |
| 2004/0022094 A1 | 2/2004 | Radhakrishnan et al. .... 365/200 |
| 2004/0024959 A1 | 2/2004 | Taylor ......................... 711/105 |
| 2004/0028412 A1 | 2/2004 | Murphy ....................... 398/135 |
| 2004/0044833 A1 | 3/2004 | Ryan ............................. 711/5 |
| 2004/0123088 A1 | 6/2004 | Poisner et al. ................. 713/1 |
| 2004/0126115 A1 | 7/2004 | Levy et al. ................... 398/116 |
| 2004/0128421 A1 | 7/2004 | Forbes ......................... 710/303 |
| 2004/0144994 A1 | 7/2004 | Lee et al. ..................... 257/200 |
| 2004/0148482 A1 | 7/2004 | Grundy et al. ............... 711/167 |
| 2004/0230718 A1 | 11/2004 | Polzin et al. ................. 710/22 |
| 2004/0251929 A1 | 12/2004 | Pax et al. ....................... 326/30 |
| 2004/0268009 A1 | 12/2004 | Shin et al. ................... 710/310 |
| 2005/0030797 A1 | 2/2005 | Pax et al. ................ 365/189.12 |
| 2005/0044304 A1 | 2/2005 | James .......................... 711/105 |
| 2005/0071542 A1 | 3/2005 | Weber et al. ................. 711/105 |
| 2005/0086441 A1 * | 4/2005 | Meyer et al. ................. 711/158 |
| 2005/0091464 A1 | 4/2005 | James .......................... 711/167 |
| 2005/0105350 A1 | 5/2005 | Zimmerman ................ 365/201 |
| 2005/0146946 A1 | 7/2005 | Taylor .................... 365/189.05 |
| 2005/0162882 A1 | 7/2005 | Reeves et al. ................. 365/63 |
| 2005/0177690 A1 | 8/2005 | LaBerge ...................... 711/154 |
| 2005/0210185 A1 * | 9/2005 | Renick ......................... 711/105 |
| 2005/0210216 A1 | 9/2005 | Jobs et al. .................... 711/170 |
| 2005/0216648 A1 | 9/2005 | Jeddeloh ...................... 710/311 |
| 2005/0228939 A1 | 10/2005 | Janzen ......................... 711/105 |

| | | | |
|---|---|---|---|
| 2005/0257021 A1 | 11/2005 | James | 711/170 |
| 2005/0268060 A1 | 12/2005 | Cronin et al. | 711/167 |
| 2006/0023528 A1 | 2/2006 | Pax et al. | 365/202 |
| 2006/0179203 A1 | 8/2006 | Jeddeloh | 710/311 |
| 2006/0179208 A1 | 8/2006 | Jeddeloh | 711/100 |
| 2006/0195647 A1 | 8/2006 | Jeddeloh | 711/100 |
| 2006/0200598 A1 | 9/2006 | Janzen | 710/58 |
| 2006/0204247 A1 | 9/2006 | Murphy | 398/139 |
| 2006/0206667 A1 | 9/2006 | Ryan | 711/115 |
| 2006/0206742 A1 | 9/2006 | James | 713/503 |
| 2006/0218331 A1 | 9/2006 | James | 710/305 |
| 2008/0162861 A1 | 7/2008 | Jobs et al. | 711/170 |

FOREIGN PATENT DOCUMENTS

| | | |
|---|---|---|
| WO | WO 93/19422 | 9/1993 |
| WO | WO 02/27499 A2 | 4/2002 |

OTHER PUBLICATIONS

Depari, A. et al., "*USB Sensor Network For Industrial Applications*", IEEE XPLORE, May 2004 (Abstract Only).

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Gillett, R. et al., "*Using The Memory Channel Network*", Micro IEEE, vol. 17, Issue 1, Jan.-Feb. 1997 (Abstract Only).

Gommans et al., "*Applications Drive Secure Lightpath Creation Across Heterogeneous Domains*", Communications Magazine, IEEE, +-vol. 44, Issue 3, Mar. 2006 (Abstract Only).

Hsieh et al., "*On The Design Of A Local Switch For Heterogenous Multi-subsystem Interconnected*", IEEE XPLORE, Oct. 1993 (Abstract Only).

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

Scott, Noel D. et al., "An Overview of the Visualize fx Graphics Accelerator Hardware," The Hewlett-Packard Journal, Article 4, May 1998, pp. 28-34.

Gillingham, Peter, "*SLDRAM Architectural and Functional Overview*", 1997 SLDRAM Consortium, Aug. 29, 1997, pp. 1-14.

Omkar et al., "*Neural Network Controller for Minimizing Hub Shear Forces in Helicopter*", IEEE XPLORE, Sep. 1998 (Abstract Only).

* cited by examiner

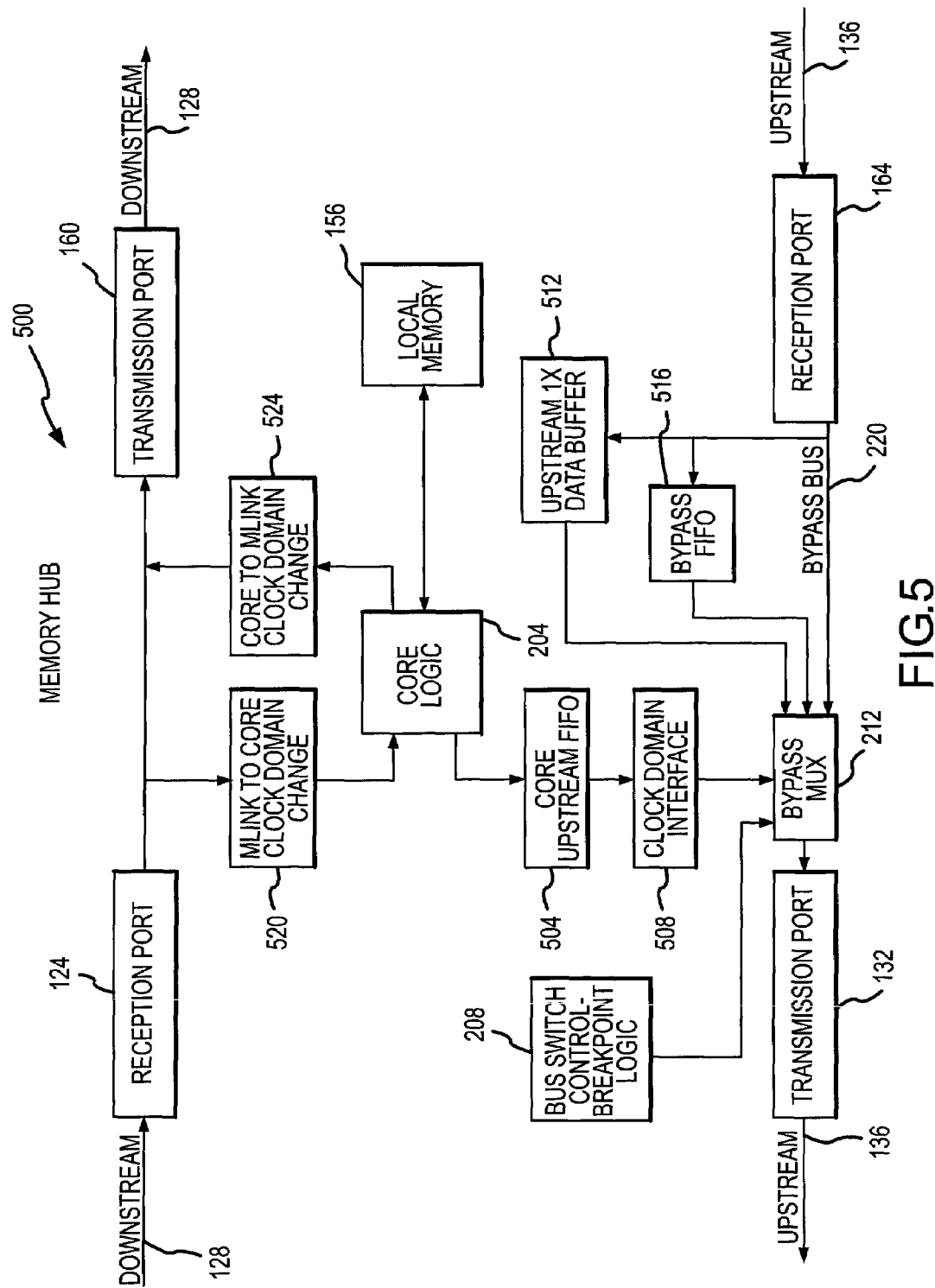

US 7,596,641 B2

SYSTEM AND METHOD FOR TRANSMITTING DATA PACKETS IN A COMPUTER SYSTEM HAVING A MEMORY HUB ARCHITECTURE

CROSS-REFERENCE TO RELATED APPLICATION

This application is a continuation of pending U.S. patent application Ser. No. 10/931,326, filed Aug. 31, 2004.

TECHNICAL FIELD

This invention relates to computer systems, and, more particularly, to a system and method for transmitting data packets in a computer system having a memory hub architecture.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory controller is coupled over a high speed link to several memory modules. Typically, the memory modules are coupled in a point-to-point or daisy chain architecture such that the memory modules are connected one to another in series. Thus, the memory controller is coupled to a first memory module over a first high speed link, with the first memory module connected to a second memory module through a second high speed link, and the second memory module coupled to a third memory module through a third high speed link, and so on in a daisy chain fashion.

Each memory module includes a memory hub that is coupled to the corresponding high speed links and a number of memory devices on the module, with the memory hubs efficiently routing memory requests and memory responses between the controller and the memory devices over the high speed links. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Moreover, this architecture also provides for easy expansion of the system memory without concern for degradation in signal quality as more memory modules are added, such as occurs in conventional multi drop bus architectures.

FIG. 1 is a block diagram of a system memory 102 that includes memory modules 104a and 104b. The memory module 104a is coupled to a system controller 108 through a downstream link 128 and an upstream link 136. Each of the memory modules 104a, 104b includes a memory hub 112, which includes a link interface 116. In the memory module 104a, the link interface 116 is connected to the system controller 108 by the links 128, 136. The link interface 116 includes a downstream reception port 124 that receives downstream memory requests from the system controller 108 over the downstream link 128, and includes an upstream transmission port 132 that provides upstream memory responses to the system controller over the upstream link 136

The system controller 108 includes a downstream transmission port 140 coupled to the downstream link 128 to provide memory requests to the memory module 104a, and also includes an upstream reception port 144 coupled to the upstream link 136 to receive memory responses from the memory module 104a. The ports 124, 132, 140, 144 and other ports to be discussed below are designated "physical" interfaces or ports since these ports are in what is commonly termed the "physical layer" of a communications system. In this case, the physical layer corresponds to components providing the actual physical connection and communications between the system controller 108 and system memory 102 as will be understood by those skilled in the art.

The nature of the reception ports 124, 144 and transmission ports 132, 140 will depend upon the characteristics of the links 128, 136. For example, in the event the links 128, 136 are implemented using optical communications paths, the reception ports 124, 144 will convert optical signals received through the optical communications path into electrical signals and the transmission ports 140, 132 will convert electrical signals into optical signals that are then transmitted over the corresponding optical communications path.

In operation, the reception port 124 captures the downstream memory requests and provides the captured memory request to local hub circuitry 148, which includes control logic for processing the request and accessing the memory devices 156 over a bus system 152 to provide the corresponding data when the request packet is directed to the memory module 104a. The reception port 124 also provides the captured downstream memory request to a downstream transmission port 160 on a bypass bus 180. The downstream transmission port 160, in turn, provides the memory request over the corresponding downstream link 128 to a downstream reception port 124 in the adjacent downstream memory module 104b. The port 124 in module 104b operates in the same way as the corresponding port in the module 104a, namely to capture the memory request and provide the request to the local hub circuitry 148 for processing and to provide the request to a downstream transmission port 160. The port 160 in the module 104b then operates in the same way as the corresponding port in module 104a to provide the memory request over the corresponding downstream link 128 to the next downstream memory module (not shown in FIG. 1).

The memory hub 112 in the module 104a further includes an upstream reception port 164 that receives memory responses over the corresponding upstream link 136 from an upstream transmission port 132 in the adjacent module 104b. An upstream transmission port 132, in turn, provides the response over the upstream link 136 to the upstream physical reception port 144 in the system controller 108. Each of the memory modules 112 includes a corresponding downstream reception port 124, upstream transmission port 132, downstream transmission port 160, and upstream reception port 164. Moreover, these ports 124, 132, 160, 164 in each module 104b operate in the same way as just described for the corresponding ports in the module 104a.

In addition to the memory responses from the downstream hubs, the local hub circuitry 148 also receives memory responses from a local memory 156. The local memory 156 may be a DRAM type memory device or other suitable memory devices as will be appreciated by those skilled in the art. The local hub circuitry 148 provides the memory responses from the local memory 156 to the upstream transmission port 132 for transmission over the upstream link 136 to the upstream reception port 144 of the controller 108. Thus, the local hub circuitry 148 must monitor and control transmission of memory responses to the system controller 108 from the downstream memory module 104b and from the local memory 156. Since the hub circuitry 148 must monitor and control transmission of memory responses to the system controller 108 from the downstream memory module 104b and the local memory 156, the hub circuitry 148 must determine the priority of transmission of the memory responses. The hub circuitry 148 also must efficiently switch the transmission of memory responses from one source to another source. The hub circuitry 148 also must switch transmission of memory responses from one source to another source at an appropriate time.

The system controller 108 can control the timing of the memory responses inside the memory hubs 112. However, if there are a large number of memory hubs 112 coupled to the system controller 108, it becomes complicated for the system controller 108 to efficiently determine the priority of transmission of memory responses and to do the scheduling in all the memory hubs 112. Also when the system controller 108 controls the scheduling of memory responses inside the memory hubs 112, the bandwidth available for data transmission is reduced.

Accordingly, there is a need for a system and method for efficiently determining the priority of transmission of the memory responses inside the memory hub 112. There is a need for a system and method for efficiently switching transmission of the memory responses from one source to another source inside the memory hub 112. There is a need for a system and method for efficiently switching transmission of the memory responses from one source to another source at an appropriate point.

SUMMARY OF THE INVENTION

The present invention is directed to a system and method for transmitting data packets from a memory hub to a memory controller. In one embodiment, the system includes an upstream reception port coupled to an upstream link. The upstream reception port receives the data packets from downstream memory hubs. The system further includes a bypass bus coupled to the upstream reception port. The bypass bus transports the data packets from the upstream reception port. The system further includes a temporary storage coupled to the upstream reception port and configured to receive the data packets from the upstream reception port. The system further includes a bypass multiplexer for selectively coupling an upstream transmission port to either one of a core logic circuit, the temporary storage, or the bypass bus. The system further includes a breakpoint logic circuit coupled to the bypass multiplexer and configured to switch the bypass multiplexer to selectively connect the upstream transmission port to either one of the core logic circuit, the bypass bus, or the temporary storage. The system further includes a local memory coupled to the core logic circuit and operable to receive and send the data packets to the core logic circuit. The bypass bus transports data packets from the downstream hubs to the upstream link when the bypass multiplexer is switched to the bypass bus. The upstream temporary storage stores the data packets from the downstream hubs when the bypass multiplexer is switched to the core logic circuit. The core logic circuit transmits the data packets from the local memory when the bypass bus is switched to the core logic circuit. The data packets from the temporary storage are transported to the upstream link when the bypass multiplexer is switched to the temporary storage.

BRIEF DESCRIPTION OF THE DRAWINGS

FIG. 5 shows a memory hub in accordance with another embodiment of the invention.

DETAILED DESCRIPTION OF THE INVENTION

Figure 1:
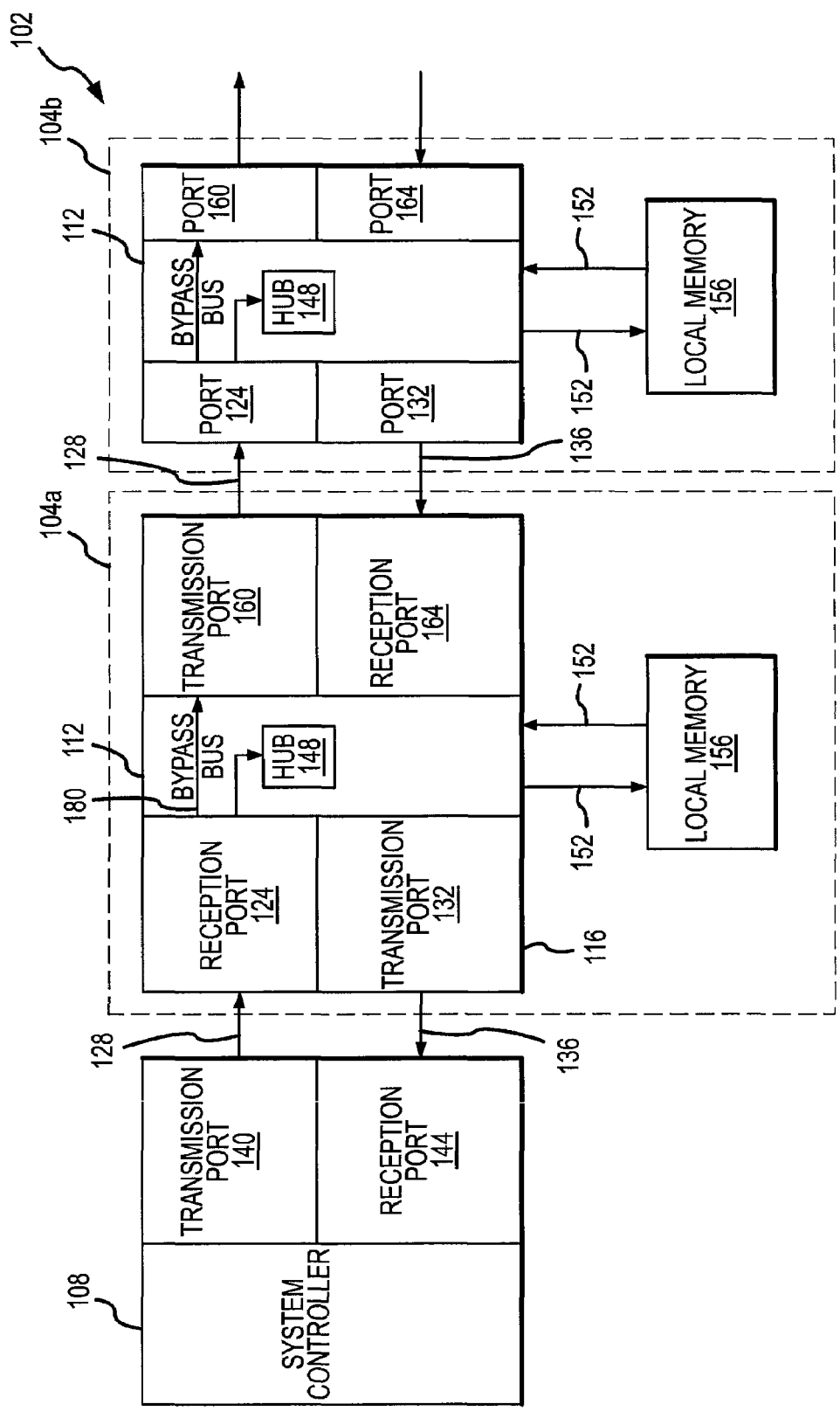
FIG. 1 is a block diagram illustrating an existing memory hubs system.
Figure 2:
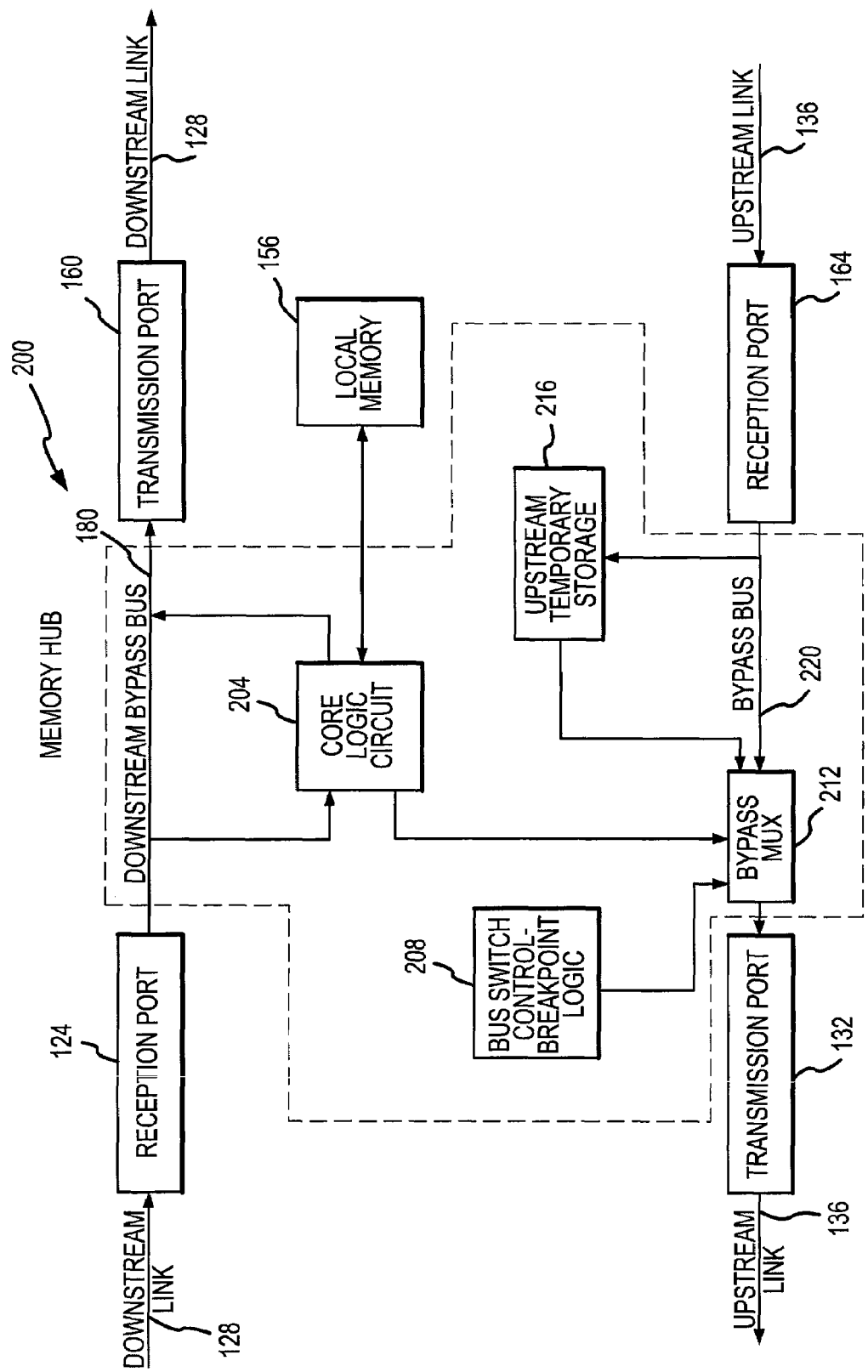
FIG. 2 is a block diagram of a memory hub in accordance with one embodiment of the invention.

FIG. 2 is a block diagram of a memory hub 200 in accordance with one embodiment of the invention. The memory hub 200 includes a core logic circuit 204 coupled to the local memory 156. The core logic circuit 204 is also coupled to the downstream reception port 124 and the downstream transmission port 160. The downstream reception port 124 is coupled to the system controller 108 (not shown in FIG. 2) via the downstream link 128. The downstream transmission port 160 is coupled to adjacent memory hubs (not shown in FIG. 2) via the downstream link 128.

The downstream reception port 124 receives read and write requests from the system controller 108 (not shown in FIG. 2) over the downstream link 128. The core logic circuit 204 receives the read and write requests from the downstream reception port 124. The core logic circuit 204 sends to the local memory 156 those read and write requests that are destined for the local memory 156. Read and write requests that are destined for downstream hubs (not shown in FIG. 2) are moved from the reception port 124 to the transmission port 160 on the downstream bypass bus.

The memory hub 200 further includes the upstream transmission port 132 that is linked to the system controller 108 by the upstream link 136. As will be discussed further, read and write responses from the core logic circuit 204 and the downstream hubs (not shown in FIG. 2) are transmitted by the upstream transmission port 132 to the system controller 108 over the upstream link 136. A read response includes read data from the local memory 156 and a write response indicates one or more write requests have been completed.

The memory hub 200 further includes a bypass multiplexer 212 coupled to the core logic 204 and a temporary storage 216. The bypass multiplexer 212 is also connected to the upstream reception port 164 via a bypass bus 220. The bypass multiplexer 212 selectively couples either the core logic 204, the bypass bus 220 or the temporary storage 216 to the upstream transmission port 132.

In operation, read and write responses from the downstream hubs are received by the upstream reception port 164 over the upstream link 136 and are passed on to the upstream transmission port 132 over the bypass bus 220 and through bypass multiplexer 212. Read responses are received by the core logic 204 from the local memory 156 and are passed on to the upstream transmission port 132 through the bypass multiplexer 212. Write responses are generated in the core logic 204 and are also passed on to the upstream transmission port 132 through the bypass multiplexer 212. As will be discussed further, when the bypass multiplexer 212 couples the core logic 204 to the upstream transmission port 132, the temporary storage 216 is used to temporarily store read and write responses from the downstream hubs. In the following description, write and read responses from the core logic 204, the downstream hubs and the temporary storage 216 will be referred to simply as "data."

As described above, the upstream transmission port 132 transmits data, over the upstream link 136, originating from one of several sources: (1) the local memory 156; (2) downstream hubs; and the temporary storage 216. The multiplexer 212 selectively couples the upstream link 136, through the transmission port 132, to either the core logic 204, the bypass bus 220 or the temporary storage 216. The multiplexer 212 is switched so that data originating from either the core logic 204, the bypass bus 220 or the temporary storage 216 are transmitted over the upstream link 136 to the system controller 108. A breakpoint logic 208 coupled to the bypass multiplexer 212 provides the switching algorithm to the bypass multiplexer 212. The switching algorithm locates switch points (also referred to as breakpoints) when a switch may occur. If the switching algorithm locates a breakpoint and it is determined that a switch should be made to another data source that has data available, the bypass multiplexer is switched so that the new data source is coupled to the upstream link 136 through the upstream transmission port 132.

In general, data is transferred among the memory hub 200, the system controller 108 and downstream hubs in a fixed data packet format. A data packet includes a beginning and an end. The breakpoint logic 208 determines the beginning or end of a data packet, and a switch is made at the beginning or end of a data packet.

In one embodiment, the core logic 204 operates at 400 MHz. The reception ports 124, 164, and the transmission ports 132, 160 operate at 1.6 GHz. The upstream link 136 and the downstream link 128 operate at 6.4 GHz.

The operating speed of these devices are selected due to design requirements. The upstream and downstream links are operated at very high speed (6.4 GHz) in order to provide a large bandwidth. However, the transmission ports 136, 160, the reception ports 124, 164, and the core logic 204 cannot be operated at such high speed using current technology. Thus, as data is transferred from the downstream link to the reception port, the transfer speed is reduced. As data is moved to the core logic, the speed is reduced further.

Figure 3:
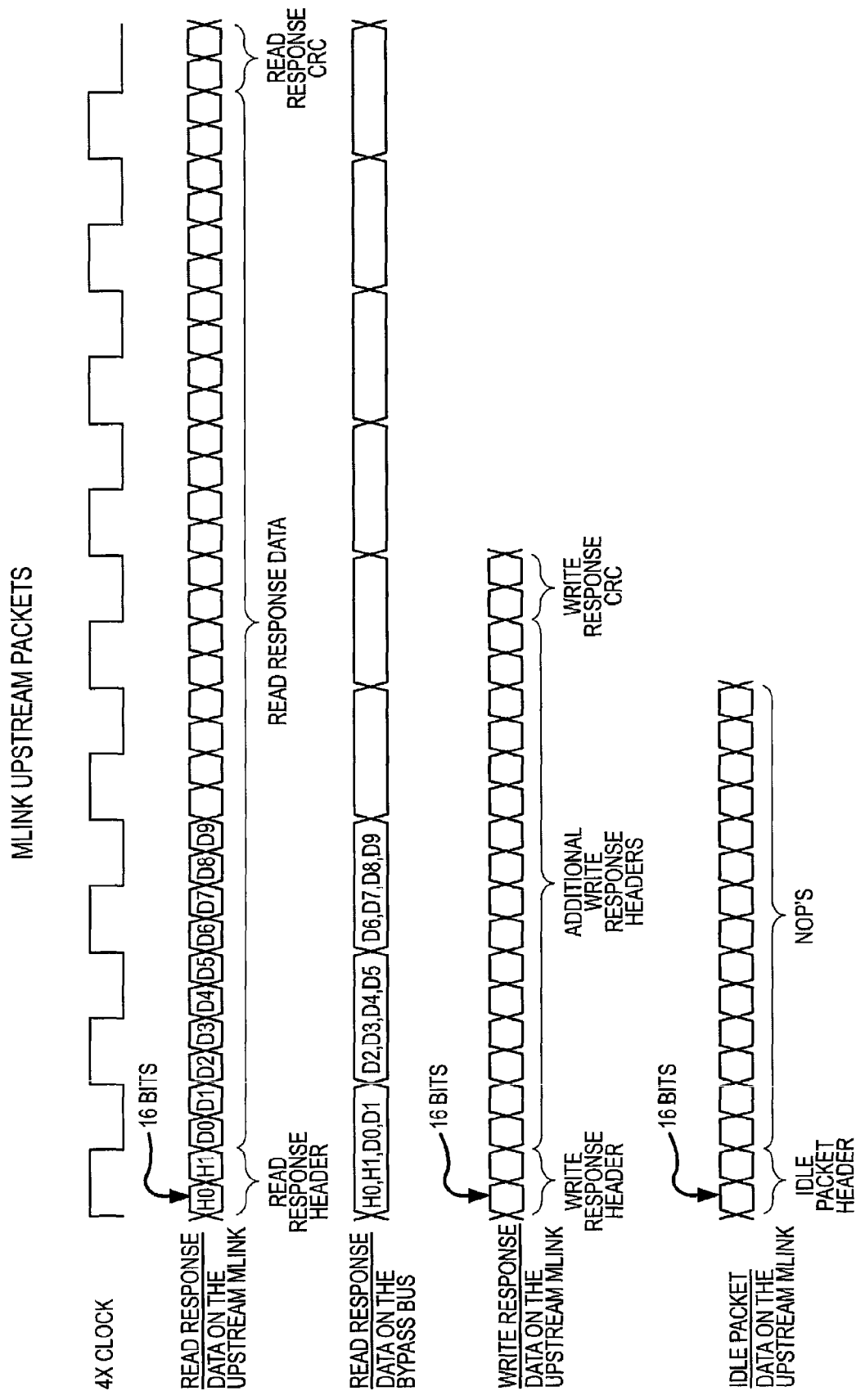
FIG. 3 shows a clock signal and upstream data packets in accordance with one embodiment of the invention.

FIG. 3 shows a clock signal, indicated as a 4X clock, where X=400 MHz, and data packets in accordance with one embodiment of the invention. The length of the data packets depends on the type of data being transferred. A write response data packet transfers limited amount of information, primarily containing an ID number and control bits indicating that it is a write response. A read response data packet includes the same information as the write response data packet, but in addition the read response data packet includes the read data being returned. Thus the response data packet is longer than the write response data packet.

In FIG. 3, the clock being used is a 4X clock which transfers 64 bits (8 bytes) in each clock cycle. In the example of FIG. 3, the read response data packet includes 64 bytes of data. These 64 bytes take 8 clock cycles to transfer. The read response data packet also includes 4 header bytes and 4 Cycle Redundancy Code (CRC) bytes, which require 1 clock cycles to transfer. Thus, the read response data packet requires a total of 9 clock cycles to transfer. The write response includes 32 bytes of data (multiple write completes), 4 bytes of header and 4 bytes of CRC. As understood by those skilled in the art, the header bytes are control bytes, and the CRC bytes are used as standard error checking mechanism.

FIG. 3 also shows an idle packet, which is four clock cycles long. The idle packet contains 4 header bytes and 28 no operation (NOP) bytes. The idle packet is sent on the upstream bus by the downstream hubs when the hubs do not have any data to send. The idle packet allows the breakpoint logic to switch when no data is being sent by the downstream hubs.

In one embodiment, a data packet moves from the upstream reception port 164 to the upstream transmission port 132 in one 1.6 GHz clock period. However, the breakpoint logic 208, which switches the bypass multiplexer 212, requires three clock periods to complete the switch because of the time required to process a decode and drive logic to switch the bypass multiplexer 212. Thus, the beginning of the data packet is located as it enters the memory hub 200, and then switching is initiated three clock cycles prior to the breakpoint so that the bypass multiplexer 212 is switched in time as the data packet arrives.

Figure 4:
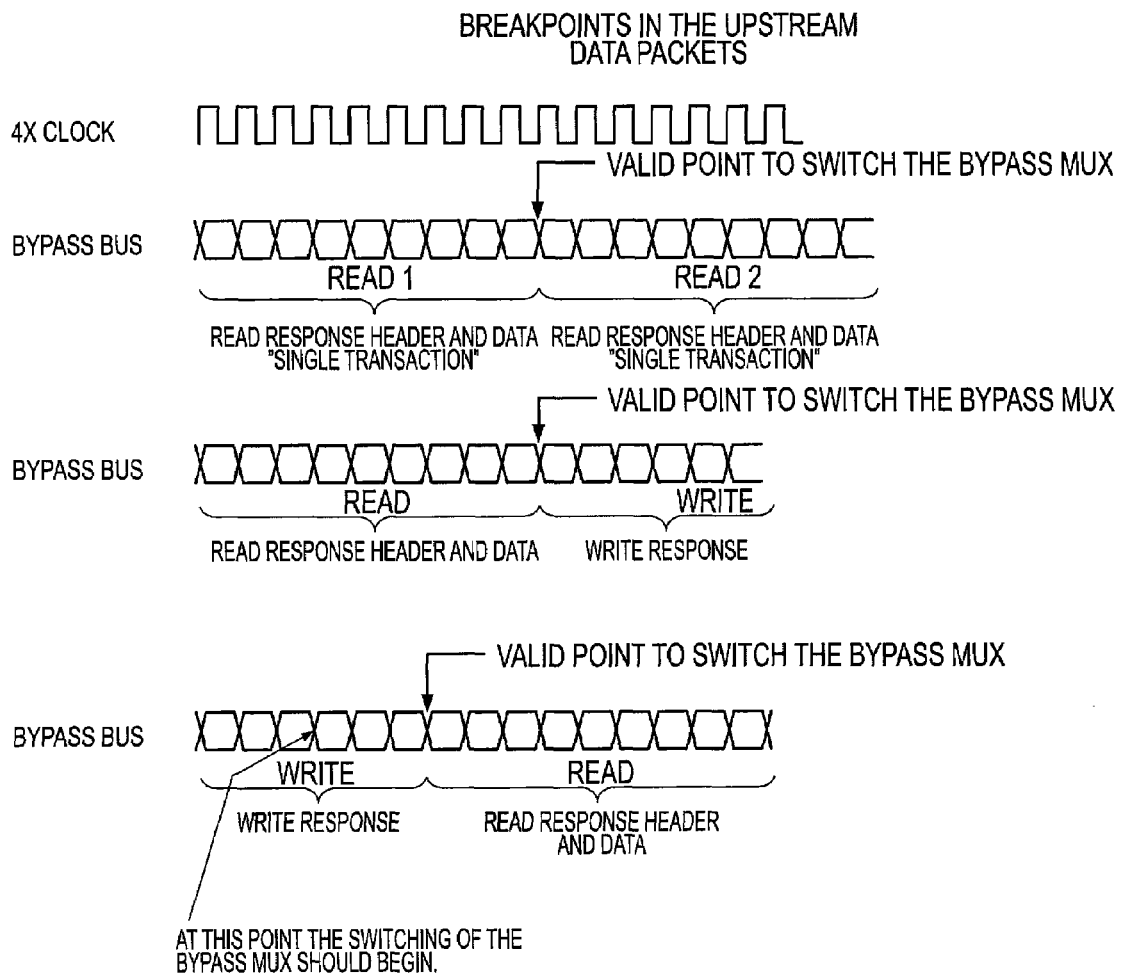
FIG. 4 shows breakpoints in upstream data packets.

FIG. 4 shows valid breakpoints in data packets. The bypass multiplexer 212 is switched at valid breakpoints. A valid breakpoint exists between two read responses, between a read response and a write response, and between a write response and a read response.

As described before, the determination that the bypass multiplexer 212 will be switched is made three clock cycles before the arrival of a data packet. By looking ahead three clock cycles before the data arrives, the switching process of the bypass multiplexer 212 can begin so that the switch coincides with the data arrival. The write response data packet in FIG. 4 shows that a determination that the bypass multiplexer 212 will be switched is made three clock cycles before a breakpoint.

FIG. 5 shows a memory hub 500 in accordance with another embodiment of the invention. The memory hub 500 includes the elements shown in FIG. 2 and described before. In addition, the memory hub 500 includes two temporary storages: an upstream buffer 512, and a bypass FIFO 516 coupled to the bypass multiplexer 212 and the bypass bus 220. The bypass FIFO is a high speed buffer operating at 4X clock speed, where X=400 MHz. The upstream buffer is a normal speed buffer operating at 1X clock speed.

When the bypass multiplexer 212 is switched to the core logic 204, incoming data packets from the downstream hubs are first stored in the bypass FIFO 516. Since the bypass FIFO 516 operates at high speed (4X clock speed), the bypass FIFO 516 can transfer data packets from its input to its output very quickly. Thus, if the core logic 204 completes sending data packet and the bypass multiplexer switches to the temporary storages, the data from the bypass FIFO 516 is available immediately.

However, if the bypass multiplexer 212 remains switched to the core logic 204, incoming data packets from the downstream hubs fill up the bypass FIFO 516. When the bypass FIFO 516 is filled up, the upstream buffer 512 is used to store data packets. As will be understood by those skilled in the art, the bypass FIFO 516 is fast, but is expensive to implement. Thus a small bypass FIFO 516 is typically used. The upstream buffer 512 is slower, but is less expensive to implement. Thus, a large upstream buffer 516 is used.

The memory hub 500 includes clock domain change circuits 520, 524, 508. As noted before, since the downstream ports 124, 160 operate at different clock frequency than the core logic 204, the downstream ports 124, 160 are not synchronous with the core logic 204. Thus, data packets cannot be directly transferred between the core logic and the downstream ports 124, 160. The clock domain change circuit 520 allows transfer of data packets from the downstream port 124 to the core logic 204, and the clock domain change circuit 524 allow the transfer of data packets from the core logic 204 to the downstream port 160. The core logic 204 is synchronous with the bypass multiplexer 212, and the clock domain change circuit 508 allows the transfer of data packets from the core logic 204 to the bypass multiplexer 212 through a core upstream FIFO 504.

In one embodiment, after power up, the breakpoint control logic 208 initially switches the bypass multiplexer 212 to the bypass bus 220, thus connecting the bypass bus 220 to the upstream link 136. The bypass bus 220 remains connected to the upstream link 136 until the core logic 204 has data to be sent and a breakpoint is available on the bypass bus 220. If the core logic 204 has data available and a breakpoint is available, the bypass multiplexer 212 is switched to the core logic 212.

When the bypass multiplexer 212 is switched to the bypass bus 220, data on the bypass bus 220 is sent to upstream link 136. When the bypass multiplexer 212 is switched to the core logic 204, data from the core logic 204 is sent to the upstream link 136. While the bypass multiplexer 212 remains switched to the core logic 204, incoming data on the bypass bus 220 is sent first to the bypass FIFO 516. When the bypass FIFO 516 is filled up, data is next to the upstream buffer 512.

In one embodiment, the bypass multiplexer 212 remains switched to the core logic 204 until the core logic 204 is empty or if a higher priority requires a switch. A higher priority is determined if the temporary storages, i.e., the bypass FIFO 516 or the upstream buffer 512, have available data. When the bypass multiplexer 212 is switched away from the core logic 204, the multiplexer 212 is first switched to the bypass FIFO 516. The data in the bypass FIFO 516 is sent upstream over the upstream link 136 until the bypass FIFO is exhausted. In general, after the bypass FIFO 516 is exhausted, the bypass multiplexer 212 is next switched to the upstream buffer 512, which is then emptied.

If the core logic 204 has data available, a switch can be made from the bypass FIFO 516 to the core logic 204 even though the bypass FIFO has not been exhausted. If a switch is made from the bypass FIFO 516 to the core logic 204, the next switch is made back to the bypass FIFO 516 in order to send the upstream data in the order it was received. When the bypass FIFO 516 empties, data is next taken from the upstream buffer 512. A switch to the core logic 204 can be made from the upstream buffer 512 even though the upstream buffer has not been exhausted. However, the next switch is made back to the upstream buffer 512 in order to send the upstream data in the order it was received.

After the bypass FIFO 516 and the upstream buffer 512 are cleared, the multiplexer 212 is normally switched to the bypass buss 220. If, however, the core logic 204 has available data, the multiplexer 212 is switched to the core logic 204. As discussed before, while the bypass multiplexer 212 is switched to the core logic 204, upstream data is first loaded into the bypass FIFO 516 and then into the upstream buffer 512. When the bypass multiplexer 212 is switched to the temporary storages, the bypass FIFO 516 is emptied first and then the upstream buffer 512 is emptied next. After the bypass FIFO 516 is emptied, it is not loaded again until the upstream buffer 512 has been emptied.

In the preceding description, certain details were set forth to provide a sufficient understanding of the present invention. One skilled in the art will appreciate, however, that the invention may be practiced without these particular details. Furthermore, one skilled in the art will appreciate that the example embodiments described above do not limit the scope of the present invention, and will also understand that various equivalent embodiments or combinations of the disclosed example embodiments are within the scope of the present invention. Illustrative examples set forth above are intended only to further illustrate certain details of the various embodiments, and should not be interpreted as limiting the scope of the present invention. Also, in the description above the operation of well known components has not been shown or described in detail to avoid unnecessarily obscuring the present invention. Finally, the invention is to be limited only by the appended claims, and is not limited to the described examples or embodiments of the invention.

The invention claimed is:

1. A memory hub operable to control communications for an upstream link, the memory hub comprising:
   a transmission port operable to transmit data to the upstream link;
   a reception port operable to receive first data for the upstream link;
   core logic operable to receive local data for the upstream link;
   a bypass multiplexer coupled to the transmission port, the reception port, and the core logic, the bypass multiplexer operable to selectively couple the upstream link to the reception port or the core logic; and
   breakpoint logic coupled to the bypass multiplexer operable to identify a breakpoint at an end of a packet and, responsive to the identification, operable to couple a control signal to the bypass multiplexer before the end of the packet is received by the reception port to initiate a switch between the reception port and the core logic.

2. The memory hub of claim 1, wherein the breakpoint logic implements a switching algorithm.

3. The memory hub of claim 1, wherein the breakpoint logic is operable to determine a type of packet received at the reception port.

4. The memory hub of claim 1, wherein the bypass multiplexer is coupled to the reception port through a bypass bus.

5. The memory hub of claim 1, further comprising a temporary memory coupled to the reception port and the breakpoint logic, the breakpoint logic further operable to selectively couple the upstream logic to the temporary memory, the temporary memory operable to store data received at the reception port when the reception port is not coupled to the upstream link.

6. The memory hub of claim 5, wherein the temporary memory comprises a FIFO memory.

7. The memory hub of claim 6, wherein the temporary memory further comprises a data buffer, the data buffer operable to store further data received at the reception port when the FIFO memory is full.

8. The memory hub of claim 1, further comprising a clock domain change circuit coupled between the core logic and the bypass multiplexer.

9. A memory system comprising:
a memory controller;
a memory hub coupled to the controller by an upstream link, the memory hub operable to control communications for the upstream link, the memory hub comprising:
a transmission port coupled to the upstream link;
a reception port operable to receive first data for the upstream link;
core logic operable to receive local data for the upstream link;
a bypass multiplexer coupled to the transmission port, the reception port, and the core logic, the bypass multiplexer operable to selectively couple the upstream link to the reception port or to a local memory; and
breakpoint logic coupled to the bypass multiplexer operable to identify a breakpoint at an end of a packet and, responsive to the identification, operable to couple a control signal to the bypass multiplexer before the end of the packet is received by the reception port to initiate a switch between the reception port and the core logic, multiplexer.

10. The memory system of claim 9 further comprising a second memory hub coupled to the reception port, the second memory hub operable to generate data for the upstream link.

11. The memory system of claim 9 further comprising a plurality of memory devices coupled to the core logic.

12. The memory system of claim 9, wherein the breakpoint logic implements a switching algorithm.

13. The memory system of claim 9, wherein the breakpoint logic is operable to determine a type of packet received at the reception port.

14. The memory system of claim 9, wherein the bypass multiplexor is coupled to the reception port through a bypass bus.

15. The memory system of claim 9, further comprising a temporary memory coupled to the reception port and the breakpoint logic, the breakpoint logic further operable to selectively couple the upstream logic to the temporary memory, the temporary memory operable to store data received at the reception port when the reception port is not coupled to the upstream link.

16. The memory system of claim 15, wherein the temporary memory comprises a FIFO memory.

17. The memory system of claim 16, wherein the temporary memory further comprises a data buffer, the data buffer operable to store further data received at the reception port when the FIFO memory is full.

18. The memory system of claim 9, further comprising a clock domain change circuit coupled between the core logic and the bypass multiplexer.

19. A method for controlling communications on an upstream link between a memory module and a memory controller, the method comprising:
coupling the upstream link to a bypass bus of the memory module, the bypass bus being operable to pass upstream data received by the memory module;
determining a local communication is available from a local memory in the memory module, the local memory comprising a local FIFO memory;
identifying a breakpoint in data on the bypass bus;
coupling the upstream link to the local FIFO memory at the breakpoint to couple the local communication to the upstream link if the local communication is available;
storing further upstream data received by the memory module in a temporary FIFO memory while the upstream link is coupled to the local FIFO memory if the temporary FIFO memory is not full; and
storing further upstream data in a second temporary memory when the temporary FIFO memory is full.

20. The method of claim 19, wherein the memory module comprises a bypass multiplexor operable to selectively couple the local memory and the bypass bus to the upstream link, the method further comprising coupling a signal to the bypass multiplexor to begin a switch prior to receiving the breakpoint data on the bypass bus.

21. The method of claim 19, wherein the act of identifying a breakpoint includes identifying a type of packet on the bypass bus.

22. The method of claim 19 wherein the second temporary memory comprises a buffer memory.

23. The method of claim 19 further comprising identifying a second breakpoint after the local communication is coupled to the upstream link, and coupling the upstream link to the temporary memory to receive the further upstream data responsive to detecting the second breakpoint.

24. A memory hub operable to control communications for an upstream link, the memory hub comprising:
a transmission port operable to transmit data to the upstream link;
a reception port operable to receive first data for the upstream link;
core logic operable to receive local data for the upstream link;
a bypass multiplexer coupled to the transmission port, the reception port, and the core logic, the bypass multiplexer operable to selectively couple the upstream link to the reception port or the core logic;
breakpoint logic coupled to the bypass multiplexer operable to identify a breakpoint and, responsive to the identification, operable to couple a control signal to the bypass multiplexer to initiate a switch between the reception port and the core logic;
a temporary FIFO memory coupled to the reception port and the breakpoint logic, the breakpoint logic further operable to selectively couple the upstream logic to the temporary FIFO memory, the temporary FIFO memory operable to store data received at the reception port when the reception port is not coupled to the upstream link; and
a data buffer operable to store further data received at the reception port when the temporary FIFO memory is full.

25. A memory hub operable to control communications for an upstream link, the memory hub comprising:
a transmission port operable to transmit data to the upstream link;
a reception port operable to receive first data for the upstream link;
core logic operable to receive local data for the upstream link;
a bypass multiplexer coupled to the transmission port, the reception port, and the core logic, the bypass multiplexer operable to selectively couple the upstream link to the reception port or the core logic;

breakpoint logic coupled to the bypass multiplexer operable to identify a breakpoint and, responsive to the identification, operable to couple a control signal to the bypass multiplexer to initiate a switch between the reception port and the core logic; and a clock domain change circuit coupled between the core logic and the bypass multiplexer.

26. A memory system comprising:

a memory controller; and a memory hub coupled to the controller by an upstream link, the memory hub operable to control communications for the upstream link, the memory hub comprising:

a transmission port coupled to the upstream link;

a reception port operable to receive first data for the upstream link;

core logic operable to receive local data for the upstream link;

a bypass multiplexer coupled to the transmission port, the reception port, and the core logic, the bypass multiplexer operable to selectively couple the upstream link to the reception port or to a local memory;

breakpoint logic coupled to the bypass multiplexer operable to identify a breakpoint and, responsive to the identification, operable to couple a control signal to the bypass multiplexer to initiate a switch between the reception port and the core logic multiplexer;

a temporary FIFO memory coupled to the reception port and the breakpoint logic, the breakpoint logic further operable to selectively couple the upstream logic to the temporary FIFO memory, the temporary FIFO memory operable to store data received at the reception port when the reception port is not coupled to the upstream link; and a data buffer operable to store further data received at the reception port when the temporary FIFO memory is full.

27. A memory system comprising:

a memory controller; and a memory hub coupled to the controller by an upstream link, the memory hub operable to control communications for the upstream link, the memory hub comprising:

a transmission port coupled to the upstream link;

a reception port operable to receive first data for the upstream link;

core logic operable to receive local data for the upstream link;

a bypass multiplexer coupled to the transmission port, the reception port, and the core logic, the bypass multiplexer operable to selectively couple the upstream link to the reception port or to a local memory;

breakpoint logic coupled to the bypass multiplexer operable to identify a breakpoint and, responsive to the identification, operable to couple a control signal to the bypass multiplexer to initiate a switch between the reception port and the core logic multiplexer; and a clock domain change circuit coupled between the core logic and the bypass multiplexer.

\* \* \* \* \*

UNITED STATES PATENT AND TRADEMARK OFFICE
CERTIFICATE OF CORRECTION

PATENT NO.         : 7,596,641 B2
APPLICATION NO.    : 11/432017
DATED              : September 29, 2009
INVENTOR(S)        : Ralph James et al.

It is certified that error appears in the above-identified patent and that said Letters Patent is hereby corrected as shown below:

On the Title Page, Item (57), under "Abstract", line 3, after "coupled" insert -- to --.

In column 1, lines 9-10, delete "pending U.S. patent application Ser. No. 10/931,326, filed Aug. 31, 2004." and insert -- U.S. patent application Ser. No. 10/931,326, filed Aug. 31, 2004, now Pat. No 7,392,331. --, therefor.

In column 9, line 31, in Claim 9, delete "logic," and insert -- logic --, therefor.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,596,641 B2
APPLICATION NO. : 11/432017
DATED : September 29, 2009
INVENTOR(S) : James et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this

Twenty-eighth Day of September, 2010

David J. Kappos
*Director of the United States Patent and Trademark Office*